United States Patent Office 3,582,267
Patented June 1, 1971

3,582,267
PROCESS FOR THE PREPARATION OF SOLID WHITE SODIUM STANNATE FROM TECHNICAL SODIUM STANNATE LIQUOR
Erich Ruf, Essen, Germany, assignor to Th. Goldschmidt A.G., Essen, Germany
No Drawing. Filed Sept. 22, 1969, Ser. No. 860,068
Int. Cl. C01g 19/00
U.S. Cl. 23—53         1 Claim

ABSTRACT OF THE DISCLOSURE

This invention relates to a process for the preparation of solid white sodium stannate from technical sodium stannate liquor by the addition of concentrated caustic soda solution, and is the improvement which comprises treating the crude contaminated sodium stannate liquor, prior to the addition of caustic soda solution, at a temperature above 40° C. with a compound selected from the group consisting of potassium permanganate in a quantity in the range of 50 to 70 percent by weight of the quantity required by determining the permanganate number or an oxidation-equivalent amount of sodium hypochlorite, separating solid material, and reacting the remaining liquor with up to about 0.1 percent by weight, based on the weight of sodium stannate liquor, of a mixture containing at least one sulfated oleic acid amide compound and at least one oleic acid amide compound.

This invention relates to an improvement in the process for the preparation of solid white sodium stannate from technical sodium stannate liquor by the addition of concentrated caustic soda solution.

Technical sodium stannate liquors, in addition to iron scrap, are obtained during the wet chemical de-tinning of tin plate wastes with the aid of caustic soda in the presence of suitable oxidizing agents. Due to the dirt which partially adheres to the tin plate wastes, and primarily because of their at least partial lacquering and the decomposition products formed therefrom in the course of the de-tinning process, such technical sodium stannate liquors are highly contaminated by inorganic, and especially by organic substances, and have a deep dark-brown color.

This deep dark-brown color, as well as the impurities, are still present to a large extent when the technical sodium stannate liquors are subjected to clarification, by permitting them to stand in suitable containers, and also when the tin of such liquors is separated in the form of stannic acid and separated stannic acid is once again converted into sodium stannate liquor by neutralization with caustic soda, which is recycled for economic reasons in the course of the de-tinning operation.

When an attempt is made to obtain solid sodium stannate from technical sodium stannate liquors by adding concentrated caustic soda solution at an elevated temperature, sodium stannate crystallizes out poorly from such liquors and is very poorly deposited.

Furthermore, sodium stannate produced in this manner is colored to a greater or lesser extent, especially by organic impurities, and includes a relatively large amount of mother liquor.

Such sodium stannate, when employed for currentless dipping or immersion tinning processes of metallic parts or of alloying parts, and/or when it is employed in electrolytic tinning processes, involves processing difficulties in view of the fact that tin is not separated in a form having a metallic luster but is spongy instead and, therefore, will not adhere well to the parts to be tin-plated.

The present invention provides an improved process whereby technical sodium stannate liquors are freed from the impurities and sodium stannate is obtained in a well crystallizing form.

In accordance with the present invention, crude contaminated sodium stannate liquor, prior to the precipitation of sodium stannate by the addition of concentrated caustic soda solution, is initially treated with at least 50 to 70 percent by weight of the amount of potassium permanganate required, which amount is ascertained by determining the permanganate number, or with an oxidation-equivalent amount of sodium hypochlorite, the treatment being at temperatures in excess of 40° C. Solid materials are then removed by decantation or filtration, for example, and the remaining liquor is reacted with up to approximately 0.1 percent by weight, based upon the weight of sodium stannate liquor, of a mixture containing at least one sulfated oleic acid amide compound and at least one oleic acid amide compound.

As is known, the permanganate number is the number of milligrams of $KMnO_4$ which are reduced from one liter of sulfate solution to be treated.

By treating technical sodium stannate liquors with suitable oxidizing agents at elevated temperatures, the organic substances are largely eliminated so that white sodium stannate can be precipitated from liquors treated in this manner.

As compared to other suitable oxidizing agents, such as sodium hypochlorite for example, potassium permanganate has the considerable advantage that a purification of technical liquors may be carried out both chemically and physically.

The high oxidation potential of potassium permanganate, when corresponding amounts thereof are employed, results in an oxidative destruction of organic substances; the managanese dioxide hydrate resulting at that time has, due to its adsorptive character, the capacity for binding organic impurities and for separating them, during deposition, from technical liquors in the carrying-down effect. The required amount of potassium permanganate for the present purification process of such technical stannate liquors may be analytically ascertained by determination of the permanganate number.

It is generally sufficient to employ, for the purification process, at least 50 to 70 percent by weight of the amount of potassium permanganate which has been ascertained by determining the permanganate number.

Sodium hypochlorite should be used in oxidation-equivalent quantities. Excess amounts of potassium permanganate should be avoided, if possible, since when an excess thereof is employed, compounds having valances higher than 4-valent manganese compounds are partially present in the solution. These dissolved manganese compounds are later reduced, at least partially, to manganese dioxide hydrate, whereby precipitated sodium stannate is rendered impure and stained brown in color. Excess potassium permanganate can be easily recognized by the dirty green color of such liquors. An excess of potassium permanganate can be eliminated in the hot solution by adding hydrazine hydrate solution immediately following the addition of potassium permanganate.

Specifically, the procedure is that the technical sodium stannate liquor is heated up to the boiling temperature together with the appropriate quantity of oxidizing agent. When potassium permanganate is employed, the hot sodium stannate liquor is permitted to stand for a short period of time. Any resulting manganese dioxide hydrate is thereby practically completely deposited. After drawing off the supernatant solution, it may be used for the recovery of sodium stannate.

It has been found that sodium stannate liquors which have been purified or clarified with suitable oxidizing agents, particularly with potassium permanganate, sodium stannate crystallizes poorly after the addition of concentrated caustic soda solution to the stannate liquor heated to a temperature of about 95° C. Above all, the sodium stannate is deposited poorly and it further includes a relatively large amount of mother liquor which cannot be separated in a subsequent centrifuging process.

In accordance with the present invention, by the addition of small quantities of at least one sulfated oleic acid amide compound in admixture with at least one non-sulfated oleic acid amide compound to sodium stannate liquors which have been purified with suitable oxidizing agents, particularly with potassium permanganate, the crystallization of sodium stannate is so favorably influenced that, aside from more rapid crystallization, particularly a rapid deposition or settling of the sodium stannate is thereby produced and the sodium stannate which crystallizes out includes virtually no mother liquor.

The crystallization-enhancing effect of sulfated oleic acid amide compounds in admixture with non-sulfated oleic acid amide compounds is produced, for example, by the addition, to about 800 liters of stannate liquor of very small quantities and specifically 50 to 200 ml. of an aqueous solution of active material, which is practically saturated with a sulfated oleic acid amide compound, in the form of the sodium salt thereof, and with a free oleic acid amide compound.

Crystallization-enhancing compounnds which may be employed are those having the formulae:

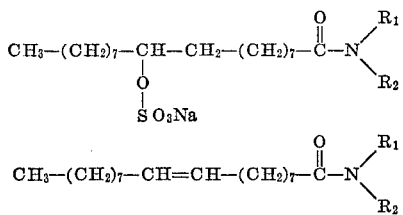

in which $R_1$ is an alkyl group having 1 to 12, preferably 1 to 4, carbon atoms, and $R_2$ is an alkyl group having 1 to 12, preferably 1 to 4, carbon atoms, or an aryl group.

Suitable compounds are, for example, the methylanilide of sulfated oleic acid and the dibutylamide of sulfated oleic acid, in each case in the form of the sodium salt thereof, and the free oleic acid amide compounds.

It will generally be sufficient to add up to 10 percent by weight of non-sulfated oleic acid amide compound, based on the weight of sulfated oleic acid amide compound. Larger quantities than 10 percent by weight of non-sulfated oleic acid amide compounds, based on the weight of sulfated oleic acid amide compounds, result, where aqueous concentrated solutions are employed, in turbidity but turbid, active material solutions produced in this manner do not influence the crystallization-enhancing effect of such mixtures.

The process according to the present invention will be further illustrated by reference to the following specific examples.

EXAMPLE 1

15 m.³ of technical sodium stannate liquor, containing 35 grams of NAOH/l., 85 grams of Sn/l., and 38 grams of $Na_2CO_3$/l., are heated in a steel tank to approximately 50° C. Then added to this liquor are 4 grams of potassium permanganate, in solid form, per liter of liquor while the solution is stirred and mixed by a circulating pump. The solution is then heated to about 100° C. while stirring and continuous circulating pumping. After an approximately three-hour heating period, the solution is permitted to stand for about 24 hours after which manganese dioxide hydrate is separated. About 800 liters of the supernatant solution are then drawn off into a 1.1 m.³ heatable steel stirring apparatus and heated therein to a temperature of 90 to 100° C. Added to this stannate liquor are 100 ml. of an aqueous active material solution which contains approximately 39 percent by weight of the methylanilide of sulfated oleic acid, in the form of the sodium salt thereof, and about 5 percent by weight of oleic acid methylanilide. Thereafter, 250 liters of a 50 percent by weight caustic soda solution are added, while stirring, with the result that sodium stannate precipitates. When the stirring apparatus is turned off, the solution is allowed to stand for 10 to 30 minutes. After the sodium stannate has settled, a clear supernatant solution is drawn off.

The separated sodium stannate, together with the residual mother liquor, is decanted while stirring into a centrifuge having a capacity of about 105 kilograms and the sodium stannate is then separated from the caustic soda solution by centrifuging. It is preferable to increase the number of revolutions slowly up to the full rotational speed to obtain as dry a product as possible.

The sodium stannate, which has been practically freed from mother liquor, then is dried in a paddle drier having a capacity of about 2 tons under a slight vacuum (about 100 torr) at a temperature of about 100° C. for about 3 to 4 hours.

About 120 kilograms of white crystalline sodium stannate are obtained.

EXAMPLE 2

The general procedure of Example 1 above is followed. After the purification of the technical sodium stannate liquor with potassium permanganate, 800 liters of stannate liquor are introduced into a heatable steel stirring apparatus having a capacity of 1.1 m.³ added and heated to a temperature of 90 to 100° C. Then added to this solution are 150 ml. of an aqueous active material solution containing about 37 percent by weight of sulfated oleic acid dibutylamide, in the form of the sodium salt thereof, and about 4 percent by weight of oleic acid dibutylamide.

The solution is then reacted, while stirring, with about 250 liters of a 50 percent caustic soda solution and further processed according to the procedure given in Example 1.

About 115 kilograms of white crystalline sodium stannate are obtained.

EXAMPLE 3

1 liter of technical sodium stannate liquor is reacted, in a two-liter round-bottom glass flask equipped with a reflux cooler, with 28.55 ml. of sodium hypochlorite solution (150 grams NaOCl/l.) and heated for about 0.5 hour to boiling temperature. The hot dark-brown colored solution, together with any suspended organic material present therein, is thereafter filtered by means of a suction filter. The light-brown colored stannate solution remaining after filtration is reacted with 0.1 ml. of an aqueous solution containing about 39 percent by weight of the methylanilide of sulfated oleic acid, in the form of the sodium salt thereof, and about 5 percent by weight of oleic methylanilide.

Thereafter, the solution is heated to a temperature of 95° C. and reacted with about 250 ml. of 50 percent by weight caustic soda solution.

After the solution has been permitted to stand for a brief period of time (about one minute), the precipitated sodium stannate is practically completely deposited. When the supernatant solution has been drawn off, sodium stanna suction filter.

The sodium stannate is then washed with 100 ml. of caustic soda solution (200 grams of NaOH/l.) and filtered dry for about 5 minutes with the aid of a water jet pump. Thereafter, the sodium stannate thus recovered is dried in a vacuum drying chamber (about 100 torr) at a temperature of about 100° C.

105 grams of white crystalline sodium stannate are obtained.

What is claimed is:

1. In the process for the preparation of solid white sodium stannate from technical sodium stannate liquor by the addition of concentrated caustic soda solution, the improvement which comprises treating the crude contaminated sodium stannate liquor, prior to the addition of caustic soda solution, at a temperature above 40° C. with a compound selected from the group consisting of potassium permanganate in a quantity in the range of 50 to 70 percent by weight of the quantity required by determining the permanganate number or an oxidation-equivalent amount of sodium hypochlorite, separating solid material, and reacting the remaining liquor with up to about 0.1 percent by weight, based on the weight of sodium stannate liquor, of a mixture containing at least one sulfated oleic acid amide compound and at least one oleic acid amide compound.

References Cited

UNITED STATES PATENTS

| 1,041,895 | 10/1912 | Spitz | 23—53 |
| 1,681,497 | 8/1928 | Read et al. | 23—53 |
| 1,708,392 | 4/1929 | McIlhenney | 23—53X |
| 2,436,974 | 3/1948 | Richter | 23—53 |
| 2,562,577 | 7/1951 | Richter | 23—53 |

HERBERT T. CARTER, Primary Examiner

PO-1050
(5/69)

UNITED STATES PATENT OFFICE
CERTIFICATE OF CORRECTION

Patent No. 3,582,267      Dated June 1, 1971

Inventor(s) Erich Ruf

It is certified that error appears in the above-identified patent and that said Letters Patent are hereby corrected as shown below:

Column 4, line 66, after "stan-", the following has been omitted and should be inserted in the patent - - - nate including the mother liquor is filtered by means of - - -

Signed and sealed this 28th day of September 1971.

(SEAL)
Attest:

EDWARD M. FLETCHER, JR.
Attesting Officer

ROBERT GOTTSCHALK
Acting Commissioner of Patents